(12) United States Patent
McGraw

(10) Patent No.: US 11,918,134 B2
(45) Date of Patent: Mar. 5, 2024

(54) ARTICLE FOR USE IN MOUNTING ASSOCIATED ARTICLES TO VERTICAL PLANAR MEMBERS SUCH AS FENCES

(71) Applicant: ARME Solutions, LLC, Barberton, OH (US)

(72) Inventor: Ryan McGraw, Wadsworth, OH (US)

(73) Assignee: ARME Solutions, LLC, Barberton, OH (US)

( * ) Notice: Subject to any disclaimer, the term of this patent is extended or adjusted under 35 U.S.C. 154(b) by 0 days.

(21) Appl. No.: 17/159,838

(22) Filed: Jan. 27, 2021

(65) Prior Publication Data

US 2022/0235901 A1    Jul. 28, 2022

(51) Int. Cl.
| | | |
|---|---|---|
| *A47G 7/04* | (2006.01) | |
| *A47B 23/02* | (2006.01) | |
| *F16B 45/00* | (2006.01) | |
| *A47B 31/06* | (2006.01) | |
| *A47B 96/06* | (2006.01) | |
| *A47G 25/06* | (2006.01) | |
| *F16M 13/02* | (2006.01) | |

(52) U.S. Cl.
CPC ............ *A47G 7/044* (2013.01); *A47B 23/02* (2013.01); *F16B 45/00* (2013.01); *A47B 31/06* (2013.01); *A47B 96/061* (2013.01); *A47G 25/0614* (2013.01); *F16M 13/02* (2013.01)

(58) Field of Classification Search
CPC .. A47G 7/044; A47G 29/083; A47G 25/0614; A47G 1/1653; A47G 7/045; F16B 45/00; F16M 13/02; F16M 13/022; A47B 23/02; A47B 23/025; A47B 23/04; A47B 31/06; A47B 96/061; F24F 13/32; B60N 3/007
See application file for complete search history.

(56) References Cited

U.S. PATENT DOCUMENTS

| | | | | |
|---|---|---|---|---|
| 660,174 | A * | 10/1900 | Tisher ..................... | A47L 3/02 182/59 |
| 1,224,127 | A * | 5/1917 | Bartlett ................ | A47B 96/061 182/62 |
| 1,480,052 | A * | 1/1924 | Epley ..................... | A47B 5/06 108/47 |

(Continued)

FOREIGN PATENT DOCUMENTS

| | | | | |
|---|---|---|---|---|
| DE | 202004019055 U1 * | 4/2005 | ............. | A47B 23/02 |
| FR | 0334770 A1 * | 9/1989 | ............. | A47G 7/044 |

(Continued)

OTHER PUBLICATIONS

Plant-N-Hang. (Apr. 14, 2021). Youtube. Retrieved Dec. 5, 2023, from https://www.youtube.com/shorts/j1zmXtolgVk (Year: 2021).*

(Continued)

*Primary Examiner* — Taylor Morris
(74) *Attorney, Agent, or Firm* — Renner, Otto, Boisselle & Sklar, LLP

(57) ABSTRACT

An article for use with an associated vertically oriented, generally planar surface may include a generally horizontal top member supported by first and second planar supporting members, which selectively receive the associated vertically oriented, generally planar associated surface therebetween.

11 Claims, 10 Drawing Sheets

(56) References Cited

U.S. PATENT DOCUMENTS

| | | | | |
|---|---|---|---|---|
| 1,493,036 A * | 5/1924 | Hay | A47B 31/06 | 108/47 |
| 1,676,124 A * | 7/1928 | Wilkie | A47G 7/044 | 248/231.61 |
| 2,029,246 A * | 1/1936 | McCarroll | A47G 7/044 | 248/208 |
| 2,867,401 A * | 1/1959 | Sheahan | A47C 7/68 | 248/362 |
| 3,867,788 A * | 2/1975 | Mickelson | A47G 7/047 | 47/67 |
| 4,059,248 A * | 11/1977 | Kuntz | A47H 27/00 | 248/214 |
| 4,084,779 A * | 4/1978 | Moineau | A47G 7/047 | 211/119 |
| 4,098,483 A * | 7/1978 | Pesola | A47G 7/045 | 248/216.1 |
| 4,199,125 A * | 4/1980 | Simon | A47K 3/001 | 248/447.2 |
| 4,415,137 A * | 11/1983 | Garves | F16M 11/041 | 211/86.01 |
| 4,559,738 A * | 12/1985 | Helfman | A47G 7/044 | 47/67 |
| 4,666,115 A * | 5/1987 | Schiro | F16M 13/022 | 248/225.11 |
| 5,094,417 A * | 3/1992 | Creed | A47G 29/083 | 248/215 |
| 5,118,059 A * | 6/1992 | Mainer | A47G 7/044 | 248/215 |
| 5,240,214 A * | 8/1993 | Birnbaum | A47G 7/044 | 248/214 |
| 5,364,050 A * | 11/1994 | Smith | A47G 7/044 | 248/226.11 |
| 5,487,517 A * | 1/1996 | Smith | A47G 7/044 | 248/215 |
| 5,711,502 A * | 1/1998 | Emalfarb | A47G 7/044 | 248/302 |
| 5,722,329 A * | 3/1998 | Weng | A47B 5/00 | 108/47 |
| 5,738,319 A * | 4/1998 | Grassi | A47G 7/044 | 248/215 |
| 5,788,198 A * | 8/1998 | Sharpe | E06C 7/16 | 248/210 |
| 5,899,147 A * | 5/1999 | Clayton | A47B 96/028 | 108/42 |
| 5,984,249 A * | 11/1999 | Cohen | A47G 7/044 | 108/47 |
| 6,050,532 A * | 4/2000 | Paul | A47G 7/044 | 248/214 |
| 6,082,270 A * | 7/2000 | Zerger | B60N 3/001 | 108/42 |
| 6,108,971 A * | 8/2000 | Zaremba | A01G 9/022 | 47/65.5 |
| 6,145,677 A * | 11/2000 | Corniel | A47G 25/0692 | 211/105.1 |
| 6,398,174 B1 * | 6/2002 | Emalfarb | A47G 7/044 | 248/214 |
| 6,547,197 B2 * | 4/2003 | Kempf | A47B 96/061 | 248/125.1 |
| 6,752,365 B2 * | 6/2004 | Vanech | A47G 7/045 | 248/218.4 |
| 6,931,998 B1 * | 8/2005 | Leese | A47B 23/02 | 108/42 |
| 7,121,213 B2 * | 10/2006 | Viazanko | A47B 5/02 | 108/42 |
| 7,210,414 B1 * | 5/2007 | Barone | A47B 23/04 | 108/42 |
| 7,523,900 B1 * | 4/2009 | Hlatky | A61G 7/0503 | 248/200.1 |
| 7,533,618 B2 * | 5/2009 | Thomason | A47B 7/00 | 108/42 |
| 7,690,612 B1 * | 4/2010 | Branson | A47G 7/045 | 248/302 |
| 7,703,732 B2 * | 4/2010 | Dantuono | A47B 96/061 | 248/235 |
| 7,735,800 B2 * | 6/2010 | Lunato | A47G 7/044 | 248/558 |
| 7,845,604 B2 * | 12/2010 | Connor, Jr. | A47G 7/044 | 248/215 |
| 8,167,260 B2 * | 5/2012 | Boccia | F24F 13/32 | 248/209 |
| 8,533,955 B2 * | 9/2013 | Agnihotri | F16M 13/02 | 248/209 |
| 8,915,197 B2 * | 12/2014 | Raml | A47B 5/00 | 108/42 |
| 9,211,023 B1 * | 12/2015 | Weiss | A47G 25/0614 | |
| 9,307,700 B1 * | 4/2016 | Schmitt | E04H 13/001 | |
| 9,474,379 B1 * | 10/2016 | Villasuso | A47C 7/68 | |
| 9,736,992 B1 * | 8/2017 | Barry | A47G 7/044 | |
| 9,909,712 B1 * | 3/2018 | Darby | A47G 7/044 | |
| 9,958,112 B1 * | 5/2018 | Johnson | A47G 7/044 | |
| 10,021,999 B1 * | 7/2018 | Khan | A47G 7/06 | |
| 10,064,488 B2 * | 9/2018 | Kunsch | A47B 96/067 | |
| 10,098,454 B2 * | 10/2018 | Hsieh | A47B 96/027 | |
| 10,219,630 B1 * | 3/2019 | Odgaard | A47B 13/16 | |
| 10,330,256 B2 * | 6/2019 | Eckhart | B25H 3/00 | |
| 10,362,862 B2 * | 7/2019 | Symalla | A47B 13/003 | |
| 10,568,445 B1 * | 2/2020 | Green | A01G 5/04 | |
| 10,687,616 B2 * | 6/2020 | Brennan | A47B 37/04 | |
| 10,898,019 B2 * | 1/2021 | Baines | A47G 25/0614 | |
| 2003/0052073 A1 * | 3/2003 | Dix | A47B 96/027 | 211/90.02 |
| 2003/0173483 A1 * | 9/2003 | Yeh | A47G 7/044 | 248/287.1 |
| 2004/0089426 A1 * | 5/2004 | Cosgrove | A47G 7/044 | 160/135 |
| 2005/0167551 A1 * | 8/2005 | Leroux | B65F 1/141 | 248/153 |
| 2005/0178059 A1 * | 8/2005 | Braun | A47G 7/044 | 47/67 |
| 2006/0032131 A1 * | 2/2006 | Marchioro | A47G 7/044 | 47/67 |
| 2006/0124817 A1 * | 6/2006 | White | A47G 7/044 | 248/339 |
| 2008/0083861 A1 * | 4/2008 | Conroy | A47G 7/045 | 248/231.41 |
| 2008/0093519 A1 * | 4/2008 | Olson | A47G 29/1216 | 248/218.4 |
| 2008/0099649 A1 * | 5/2008 | Cavasos | A47G 7/044 | 248/316.1 |
| 2008/0110087 A1 * | 5/2008 | Serio | A01G 9/02 | 47/65.5 |
| 2008/0308695 A1 * | 12/2008 | Lambert | A47G 7/044 | 248/226.11 |
| 2009/0000523 A1 * | 1/2009 | Ciardelli | A47B 37/04 | 108/42 |
| 2009/0071180 A1 * | 3/2009 | Jones | F24F 13/32 | 62/262 |
| 2010/0101143 A1 * | 4/2010 | Fima | A47G 7/044 | 47/65.5 |
| 2010/0325949 A1 * | 12/2010 | Carlson | A01G 9/12 | 47/45 |
| 2011/0041398 A1 * | 2/2011 | Armas | A47G 7/044 | 47/39 |
| 2012/0138761 A1 * | 6/2012 | Messinger | A47B 96/028 | 248/226.11 |
| 2012/0144654 A1 * | 6/2012 | Christian | A47G 7/045 | 29/525.08 |
| 2013/0193287 A1 * | 8/2013 | Murphy | A47G 7/045 | 248/219.1 |
| 2013/0240697 A1 * | 9/2013 | Rutigliano | A47G 7/044 | 248/227.1 |
| 2014/0332619 A1 * | 11/2014 | Yang | A47K 10/10 | 242/597.8 |
| 2014/0339386 A1 * | 11/2014 | Rife | A47G 29/083 | 248/227.2 |
| 2015/0238012 A1 * | 8/2015 | Reviel | F16M 13/022 | 108/42 |

(56) References Cited

U.S. PATENT DOCUMENTS

| | | | |
|---|---|---|---|
| 2015/0238027 A1* | 8/2015 | Yeh | A47G 25/0614 |
| | | | 248/307 |
| 2015/0300562 A1* | 10/2015 | Gillen | A01K 31/06 |
| | | | 248/219.3 |
| 2018/0084936 A1* | 3/2018 | Bacallao | F16M 13/02 |
| 2018/0231180 A1* | 8/2018 | Zoutman | A01K 39/01 |
| 2019/0343304 A1* | 11/2019 | Murphy | A47G 7/045 |
| 2020/0037791 A1* | 2/2020 | Sullivan | A47G 7/045 |
| 2020/0297140 A1* | 9/2020 | Lee | A47G 25/0614 |

FOREIGN PATENT DOCUMENTS

| | | | | | |
|---|---|---|---|---|---|
| GB | | 2362807 A | * | 12/2001 | A47G 7/044 |
| GB | | 2380398 A | * | 4/2003 | A47G 7/044 |

OTHER PUBLICATIONS

Plant-N-Hang. (Jan. 28, 2021). Facebook. Retrieved Dec. 5, 2023, from https://www.facebook.com/plantnhang/ (Year: 2021).*

* cited by examiner

ARTICLE FOR USE IN MOUNTING ASSOCIATED ARTICLES TO VERTICAL PLANAR MEMBERS SUCH AS FENCES

1. BACKGROUND

A. Field of the Invention

This invention generally relates to methods and apparatuses related to articles for use with fences or other generally vertically oriented planar member so that associated articles, such as flowerpots, lawn ornaments, or the like may be stored thereupon.

B. Description of Related Art

Many people live near, work near, or otherwise have access to planar, vertically oriented members or structures. One common generally vertically oriented planar member, and the one that is illustrated herein, is a fence, such as might be deployed around a homeowner's yard. However, many other generally vertically oriented planar structures are in common use, such as cubicle walls in a commercial office setting, dividers in a checkout area for a commercial retail or grocery store, or a workstation in a factory. In each of these applications, the invention has applicability and use, although the discussion hereafter will be constrained to a single exemplary application of the invention, that of a fence that might surround periphery of a homeowner's yard.

What is needed is an inexpensive, durable, and useful article which works together with the vertically oriented planar an associated structure or member to provide opportunities for the user to store useful and beautiful things. This invention will provide numerous other advantages as will be readily understood by a person of skill in the art.

II. SUMMARY

An article according to the invention comprises a first supporting member which has a first interior surface. The article also has a second supporting member which has a second interior surface. The first and second supporting members are generally parallel and are configured to selectively receive therebetween an associated planar member, so that said first interior surface of said first supporting member and said second interior surface of said second supporting member are in selective operative engagement with first and second exterior surfaces of the associated generally vertically oriented planar member and thereby selectively, removably attach the article atop a top surface of the planar surface. A generally planar top member is connected to said first and second supporting members. The generally planar top member has a longitudinal centerline and a length. A plane of the associated generally vertically oriented planar member intersects said longitudinal centerline of said top member, but not bisecting said longitudinal centerline of said top member. The article further includes an opportunity location, which is at a first end of said top member and which may include a hook or an eyelet, or a battery powered or solar powered light source.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
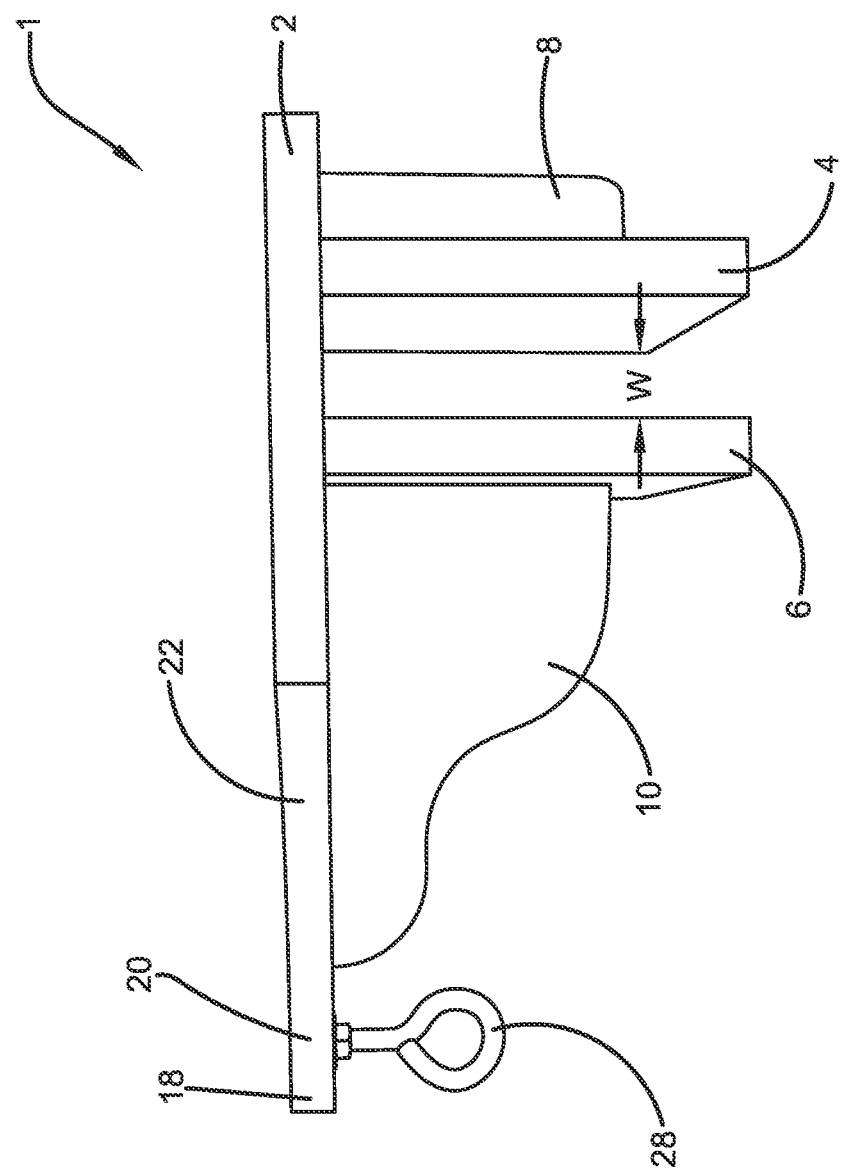
FIG. 1 is a side view of an article according to the invention.

Referring now to the drawings wherein the showings are for purposes of illustrating embodiments of the invention only and not for purposes of limiting the same, and wherein like reference numerals are understood to refer to like components, FIGS. 1-10 illustrate the article as used in conjunction with an associated fence. FIG. 1 shows a side view of an article 1 according to the invention. The article 1 has a top member 2, a first supporting member 4, and a second supporting member 6. With continuing reference to FIG. 1, the article 1 also comprises a first longitudinal support member 8 and a second longitudinal support member 10.

Figure 2:
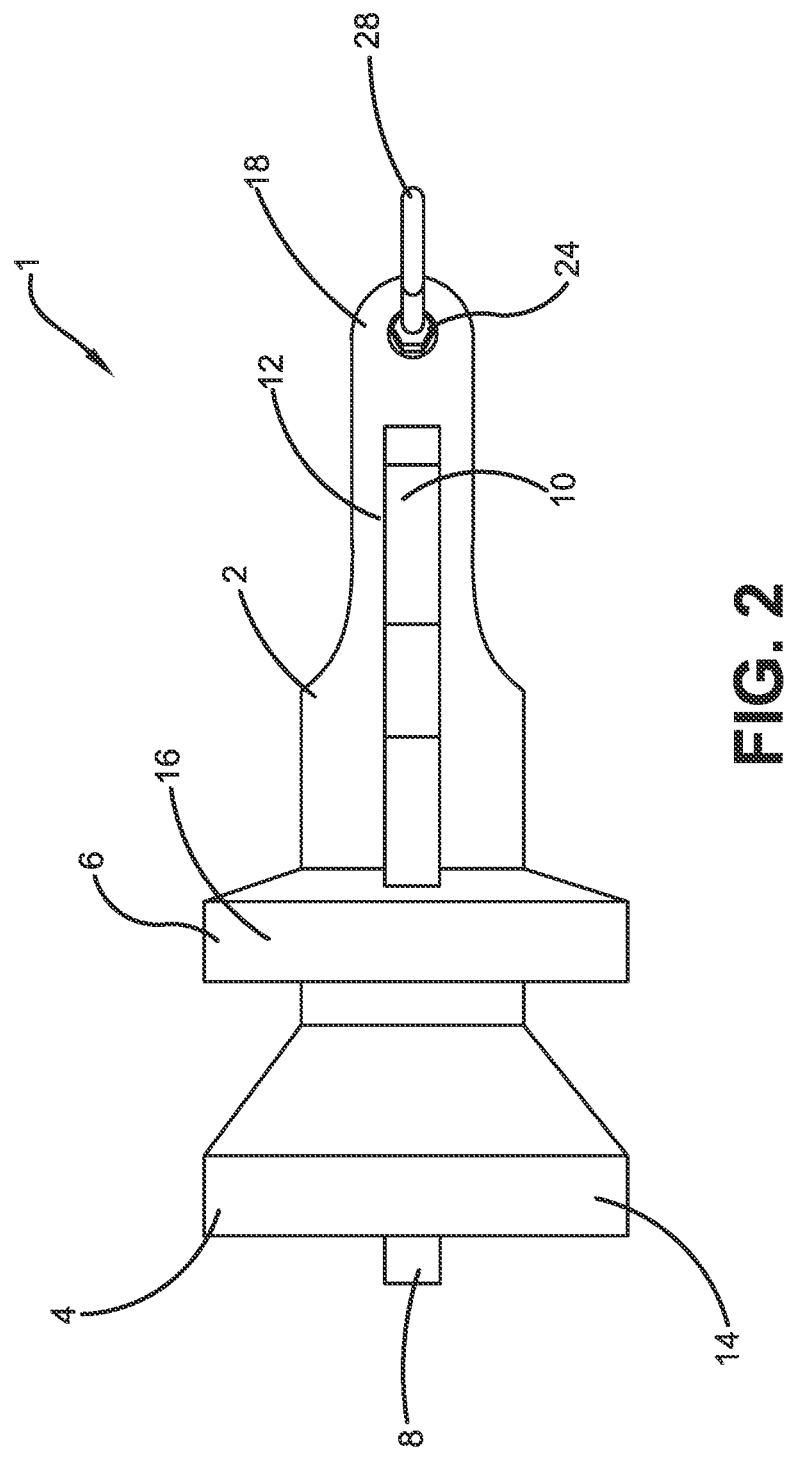
FIG. 2 is a bottom view of the article according to the invention.

With reference to FIGS. 1 and 2, the article 1 will be further illustrated. FIG. 2 shows the underside of the article 1. For example, the underside 12 of the top member 2 is illustrated as well as a bottom surface 14 of the first supporting member 4 and a bottom surface 16 of the second supporting member 6.

With continuing reference to FIGS. 1 and 2, at a first end 18 of the top member 2 is located an opportunity location 20. The opportunity location 20 is named such because of the breadth of "opportunities" it presents. Essentially, because of the stability provided by first and second supporting members 4, 6, the top member 2 can be cantilevered into a desired space, such as a back yard, a workstation, or an office cubicle. Therefore, the top surface 20 of the top member 2 can be used to support items depending on the opportunity and need. For example, if the article 1 is used in an office setting, and the article 1 is received atop a cubicle divider, with the vertical planar surface of the vertical divider received therebetween first and second supporting members 4, 6, respectively, then the opportunity location 20 can be extended into the cubicle workspace and atop the top member 2 can be located tools (calculator, writing instruments, video camera for conferences, microphone for video conferences, etc.), if the article 1 is used in a factory setting where it is mounted upon an associated workstation divider, then tools necessary for the functions of that workstation can be located thereupon (wrenches, sealant in a tube, micrometer, ruler or measuring tape, etc.), or if the article 1 is located on a residential fence, the opportunity location 20 can be used for beautiful things such as a flowerpot, a windchime, or a handy storage space for garden tools (hand trowel, grass seed, small plants to be planted, etc.) while the article 1 is moved along the fence to wherever the homeowner is working. In a preferred embodiment, a hole 24 is drilled through the opportunity, location 20 which provides the opportunity to more permanently mount an implement. For example, one such implement might be a lamp, ideally powered by solar power or even battery so that the location along the fence may be illuminated. Another example as illustrated in FIGS. 1 and 2 is a hook or eyelet 28 which can be used to store a variety of helpful associated implements such as a hanging flower basket.

Figure 3:
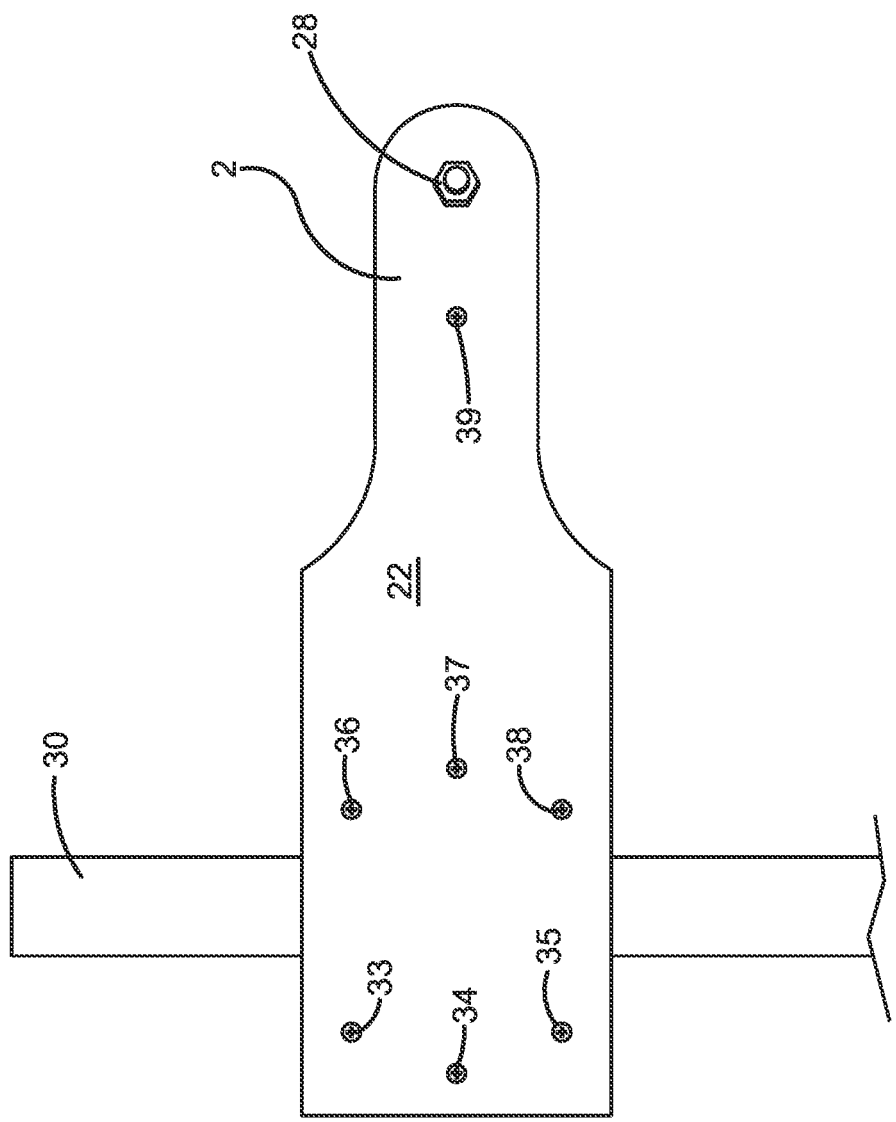
FIG. 3 is a top view of the article according to the invention.
Figure 4:
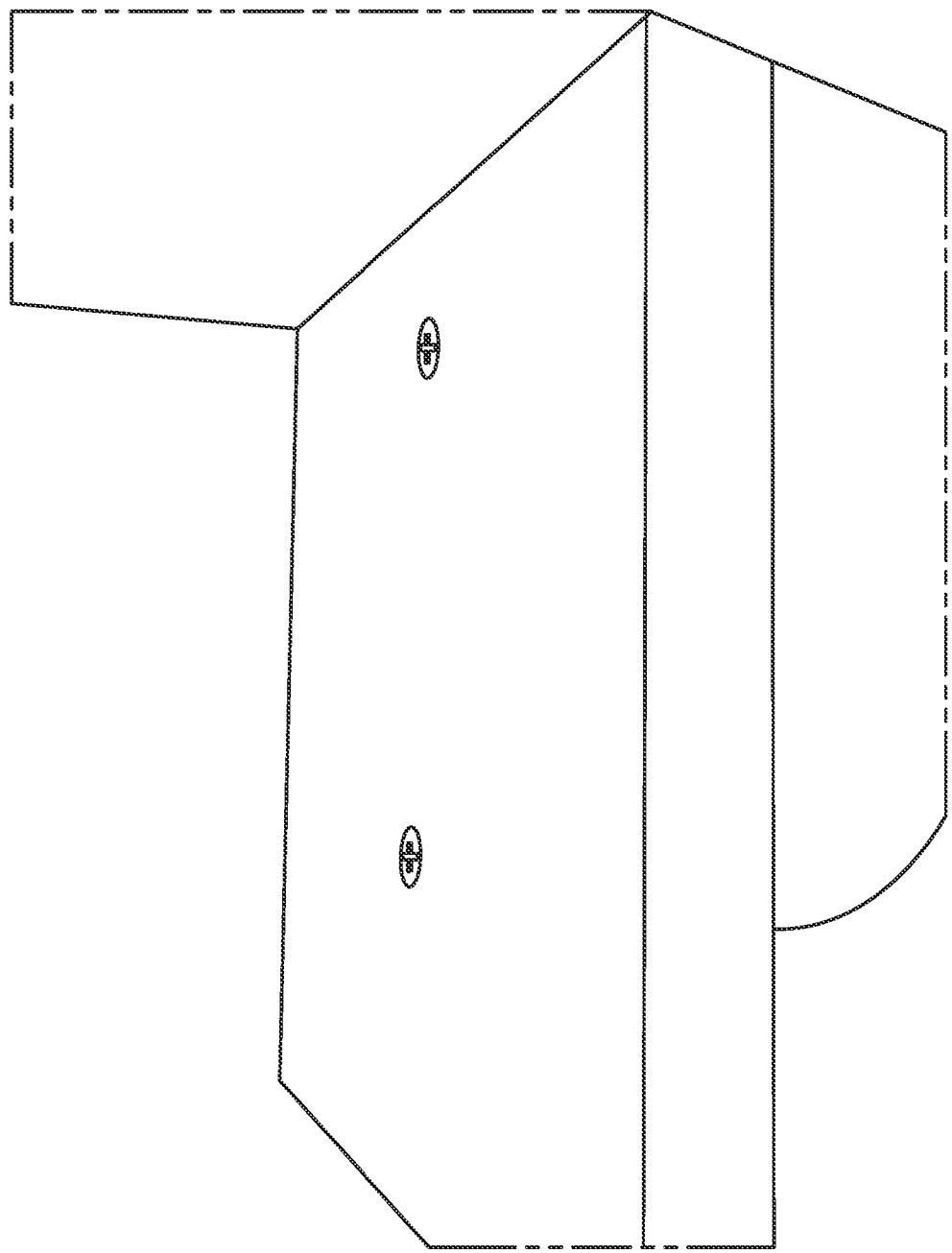
FIG. 4 is a closeup view of the article and fastener according to the invention.
Figure 5:
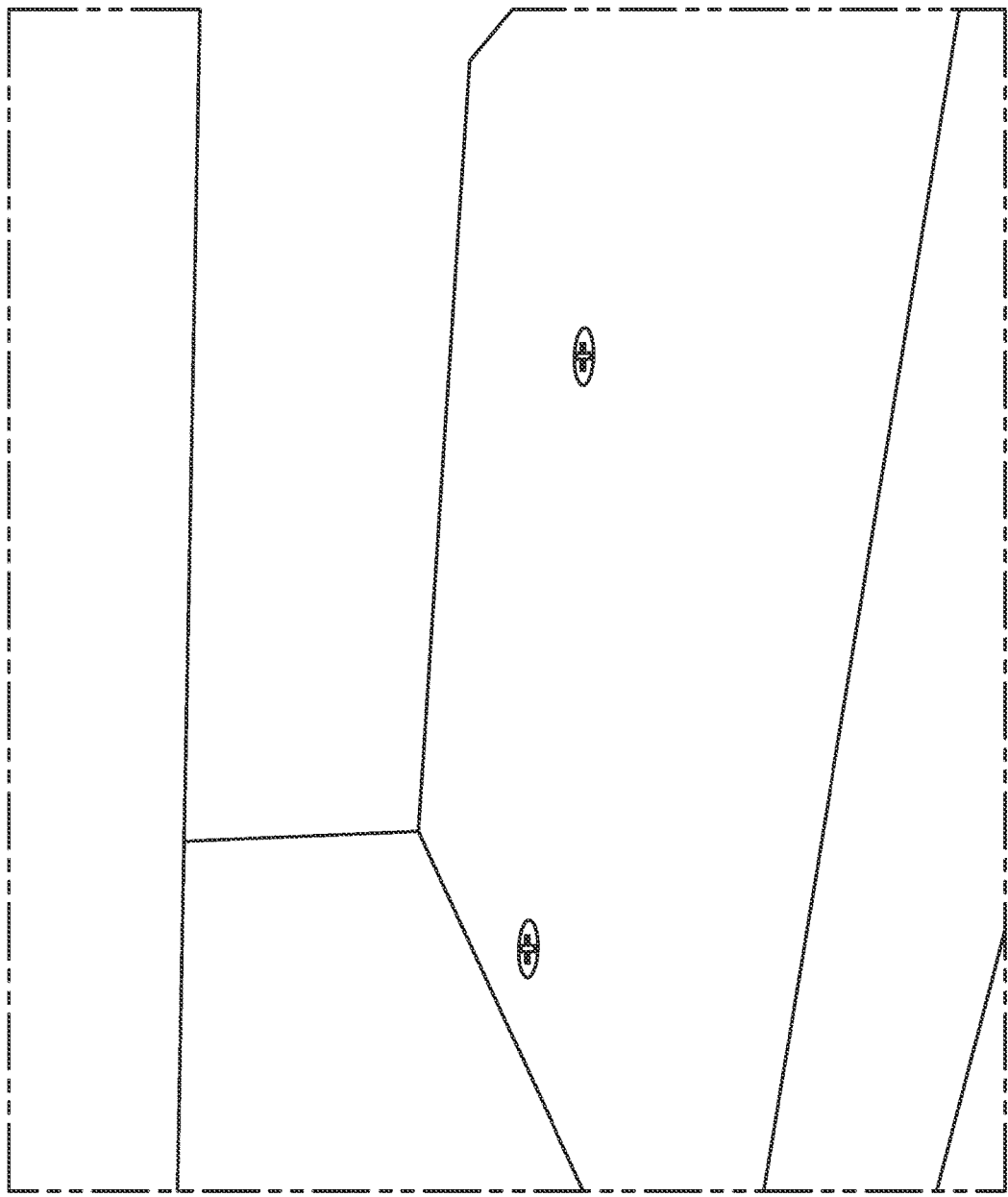
FIG. 5 is a closeup view of the article and fastener according to the invention.
Figure 6:
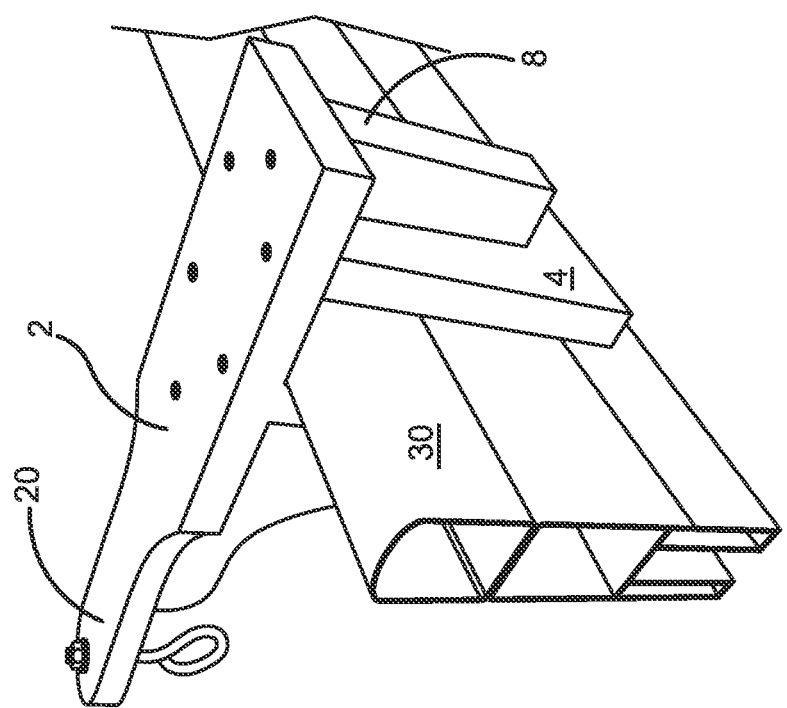
FIG. 6 is a perspective view of the article mounted onto an associated generally vertically oriented planar member (or fence) fastener according to the invention.
Figure 7:
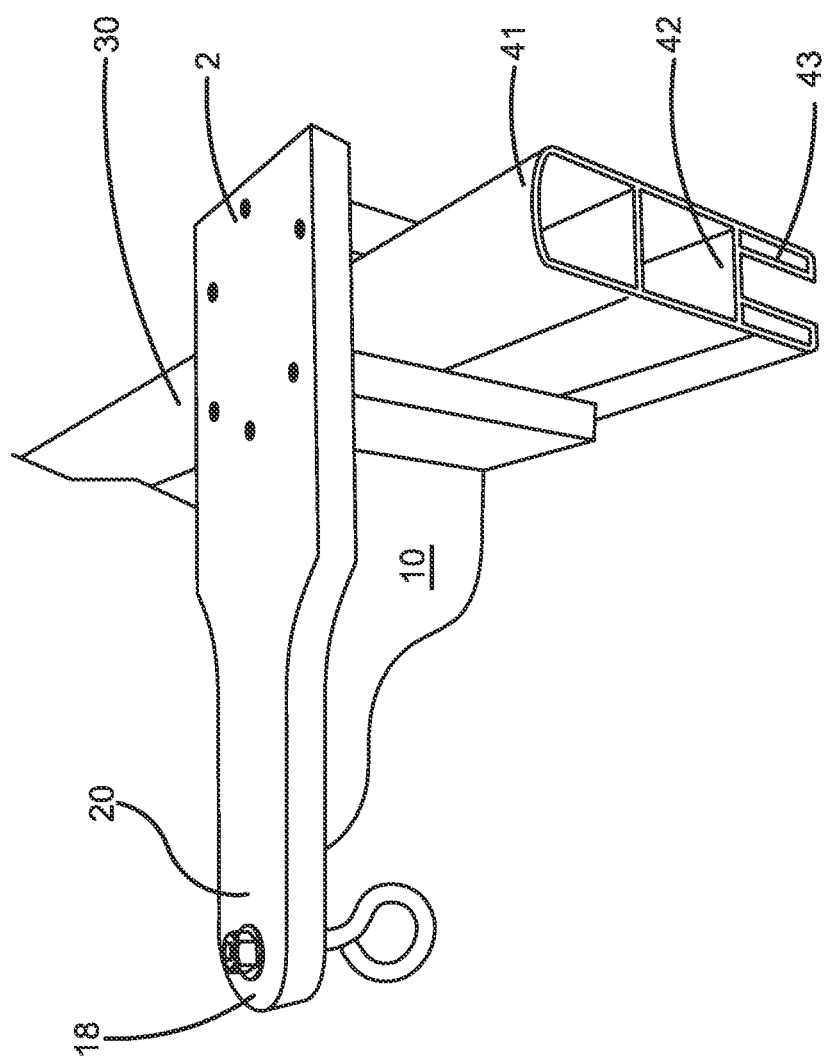
FIG. 7 is a perspective view of the article mounted onto an associated generally vertically oriented planar member (or fence) fastener according to the invention.
Figure 8:
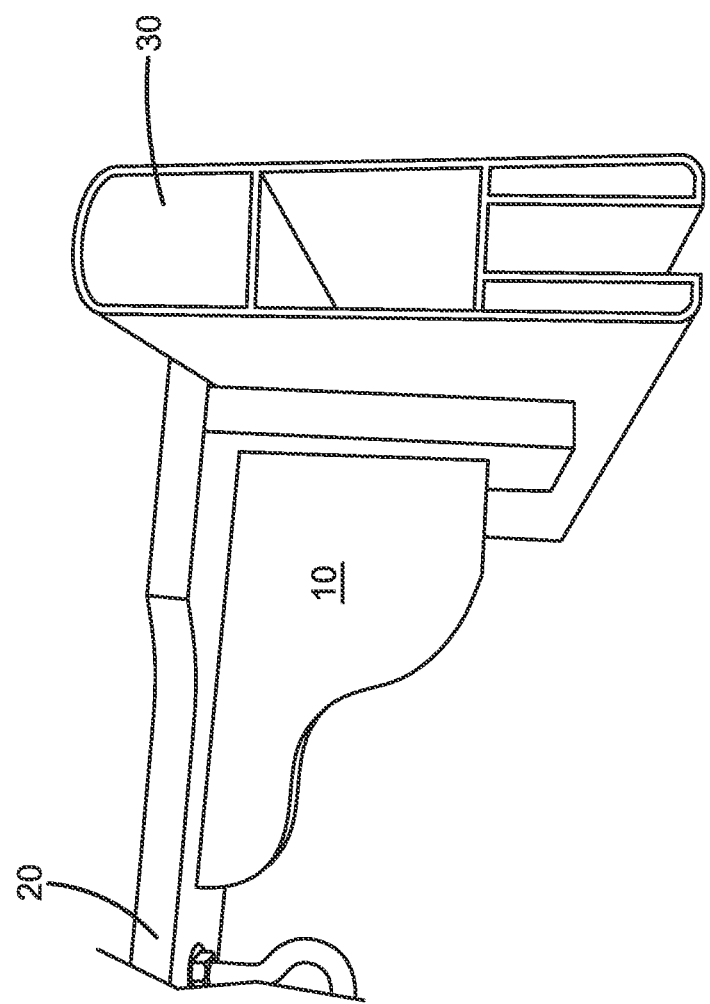
FIG. 8 is a side view of the article mounted onto an associated generally vertically oriented planar member (or fence) fastener according to the invention.
Figure 9:
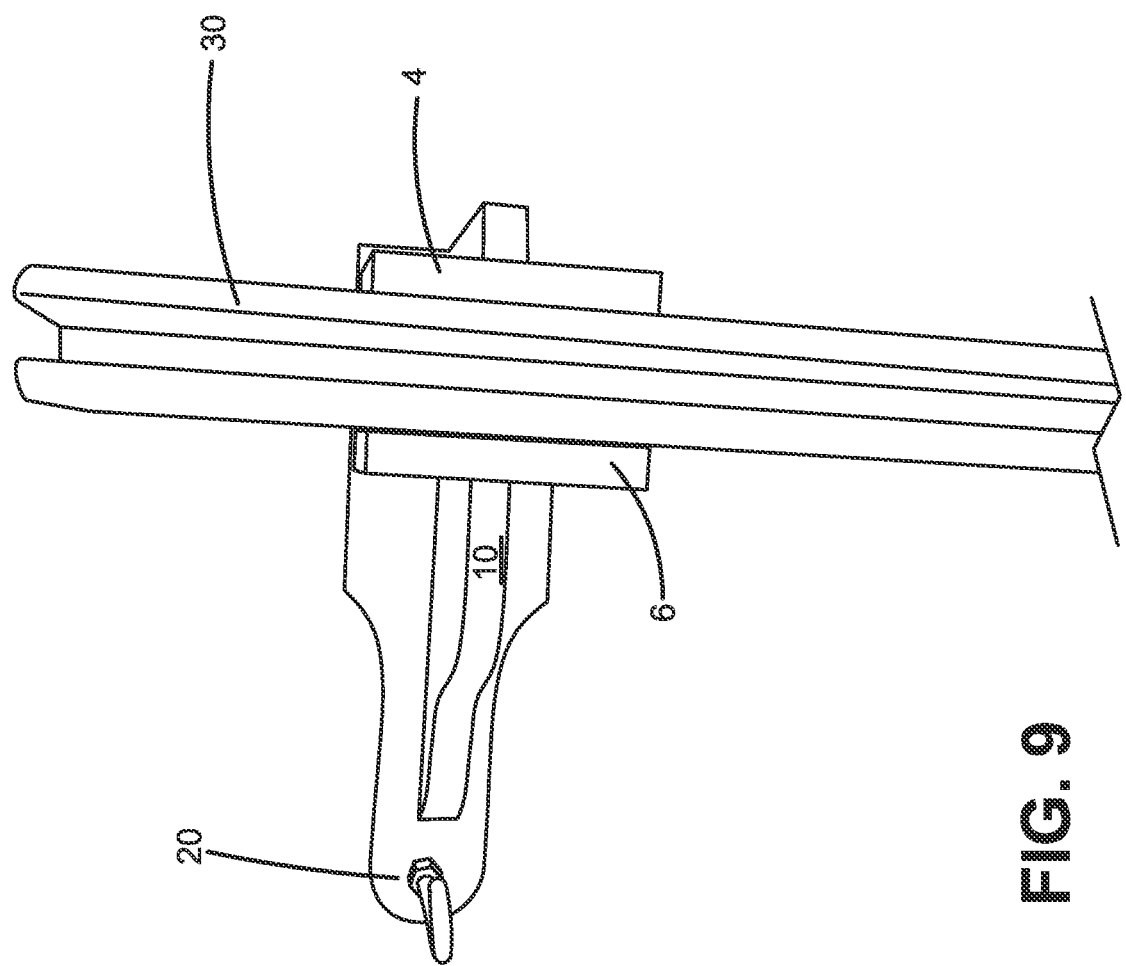
FIG. 9 is a bottom view of the article mounted onto an associated generally vertically oriented planar member (or fence) fastener according to the invention.
Figure 10:
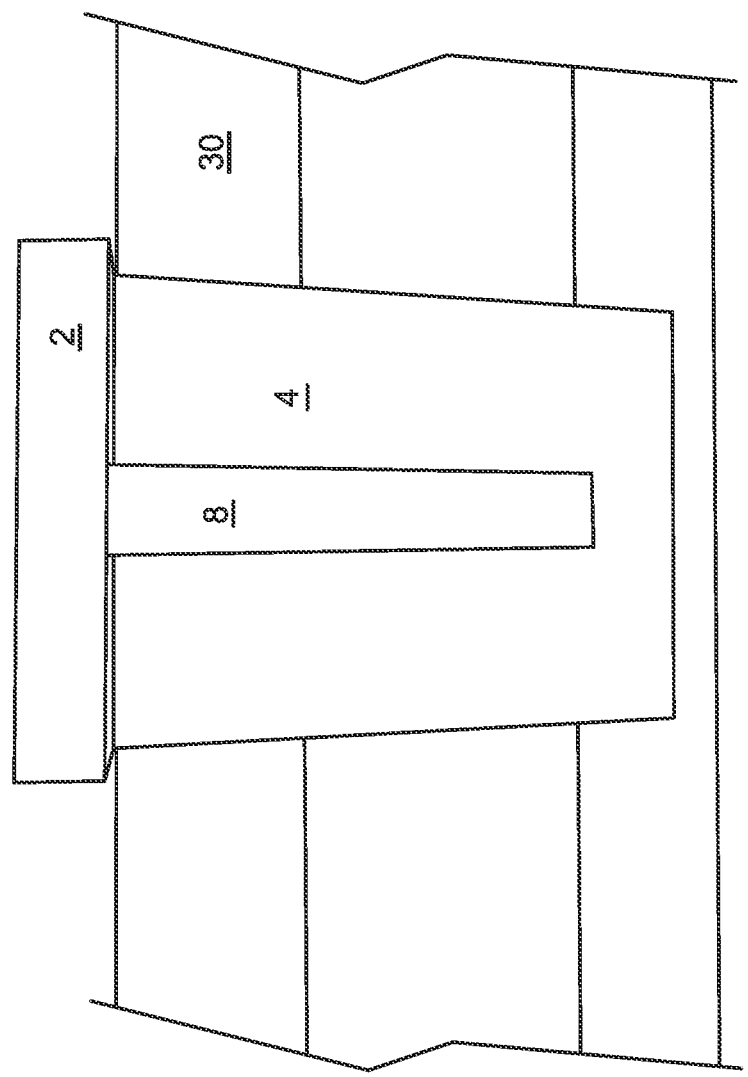
FIG. 10 is a side view of the article mounted onto an associated generally vertically oriented planar member (or fence) fastener according to the invention.

With reference to FIGS. 3-5, the manufacturing of the article 1 is illustrated. With reference to FIG. 3, the top surface 22, top member 2 is shown. Also shown in an end view of an associated vertical planar member 30. While the associated vertical planar member 30 can take a variety of forms as already discussed, for the remainder of this disclosure, the associated vertical planar member shall be referred to as a fence, although it should be understood that the associated vertical planar member should not be limited to fences. With continued reference to FIG. 3, seven different fasteners are illustrated. First fastener 33, second fastener 34, third fastener 35, fourth fastener 36, fifth fastener 37, sixth fastener 38, and seventh fastener 39 are shown in FIG. 3. In each case, the fastener is a screw which is driven through the top surface 22 of the top member 2 into other aspects of the article 1. For example, first, fastener 33 and third fastener 35 are driven into the first supporting member 4. The second fastener 34 is driven into the first longitudinal support member 8. The fourth fastener 36 and the sixth fastener 38 are driven into the second supporting member 6. The fifth fastener 37 is driven into the second longitudinal support member 10. The seventh fastener 39 is also driven into the second longitudinal support member 10. Due to the advantageous configuration of the members of the article 1 with only seven fasteners 33-39, a stable and secure article 1 is configured. FIG. 4 and FIG. 5 show additional views of the fasteners 33-39.

With reference to FIGS. 6-10, the article 1 is shown in operative engagement to an associated generally vertically oriented planar member 30, or, in the current illustration, a fence 30. In FIGS. 6-10, the associated fence 30 is shown as a plastic fence 30 made up of modular plastic members 41, 42, 43, although other fence designs will also work with the article 1.

Now the operation of the article 1 will be described. In the preferred embodiment, the article 1 will be manufactured via use of the seven fasteners 33-39, already described, and will be shipped as an assembled unit. The user may use the article 1 in a variety of ways as the variety of generally vertically oriented planar member abounds. Because the width (W) as shown in FIG. 1 is sized to fit the particular width of the associated fence or vertical planar member 30, the article 1 is simply slid onto the fence 30. No tool or sealant is generally needed. The article 1 is available for immediate use. The article 1 can be selectively attached to the fence, to a portion of the fence, or can be conveniently moved along the fence as desired. One common application is a place to store garden tools while the user works along the base of the fence 30, such as painting the fence or planting flowers or vegetation along the base of the fence 30. Another common use for the article 1 might be a drink holder or a place to store food. For example, a party host may wish to provide an article 1 for each of their guests so that the guest may place the article 1 on an associated fence to the guest's plate of food or a beverage. In the context of a manufacturing plant where manufacturing cells are located on the manufacturing floor, it is advantageous to have tools and parts handy for the human or robotic operator, so that the parts and tools are nearby the manufactured part, speeding and facilitating the manufacturing process. The article 1 provides an opportunity for such parts or tools to be within easy reach of a human operator or robot.

In one design, the width (W) between the interior walls of the first and second supporting members 4, 6 is selectively adjustable with a slide. The choice and configuration of the slide is within the ordinary skill of the art. For example, the operator might use a fastener with a wing nut to adjust the width (W) to a desired width (for example, the width of the generally vertical planar structure 30 with which the article 1 will be used) and then secures that width by use of the fastener and wing nut.

With continued reference to the FIGURES, one helpful implement is shown, namely the hook or eyelet 28. Although this is a likely favorite implement, especially for the application in a residential fence opportunity, other valuable implements can be used, especially at the opportunity location 20. For example, it is known in the art for lighting sources to be powered by battery or by solar panels. The article 1 provides a convenient location and mechanism to support such a light. The solar panel could be located on the top surface 22 of the top member 2, while the light itself could be located on a bottom surface 14 of the top member 2 thereby shining its light down on a path near the fence. Or, in the case of a light which is battery powered, the battery powered light source could simply be mounted to the lower surface of the top member 2. The elongated, flat, top surface 22 of the top member 2 is suitable for a variety of useful and beautiful applications, such as a series of potted plants or flowers, perhaps complemented by a hanging basket hanging from eyelet 28.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby, unconditionally reserved.

I claim:
1. An article comprising:
   a first supporting member;
   a second supporting member; a generally planar top member comprising a first end directly attached to the first supporting member and the second supporting member;
   a first longitudinal support member adjacent the first supporting member and the generally planar top member;
   a second longitudinal support member adjacent the second supporting member and the generally planar top member; and wherein the first supporting member, the second supporting member, and the generally planar top member are arranged to conform around an associated planar member;

wherein a second end of the generally planar top member is cantilevered into a desired space;

wherein the second end of the generally planar top member comprises a hook or eyelet mounted to an underside of the second end;

wherein the first longitudinal support member is separate from the first supporting member;

wherein the first longitudinal support member is directly attached to the generally planar top member;

wherein the generally planar top member has a length defining a longitudinal axis;

wherein the second longitudinal support member is longer than the first longitudinal support member along the longitudinal axis; and wherein the first longitudinal support member is shaped differently than the second longitudinal support member.

2. The article of claim 1 wherein the generally planar top member has a longitudinal centerline; the generally planar top member being arranged so that the longitudinal centerline of the generally planar top member intersects a plane of the associated planar member but the plane of the associated planar member does not bisect the longitudinal centerline of the generally planar top member.

3. The article of claim 1 further comprising:
the first and second supporting members being substantially parallel.

4. The article of claim 3, wherein the first supporting member is attached to the generally planar top member by fastening means.

5. The article of claim 3, wherein the second supporting member is substantially straight.

6. The article of claim 1 wherein the first supporting member further comprises a first inward surface and the second supporting member further comprises a second inward surface; the first and second inward surfaces are configured to selectively and operatively engage first and second outer surfaces of the associated planar member.

7. The article of claim 6, wherein the first inward surface and the second inward surface are separated by a fixed width.

8. The article of claim 1, wherein the first supporting member is placed along a central axis of the generally planar top member.

9. An article comprising:
a first supporting member, the first supporting member having a first interior surface;
a second supporting member; the second supporting member having a second interior surface, the first and second supporting members being substantially parallel and, are arranged to receive between them an associated generally vertically oriented planar member, the first and second supporting members are further configured so that the first interior surface of the first supporting member and the second interior surface of the second supporting member are in selective operative engagement with first and second exterior surfaces of the associated generally vertically oriented planar member and thereby selectively, removably affix the article atop a top surface of the associated generally vertically oriented planar surface member;
a generally planar top member comprising a first end which is attached to the first and second supporting members, the generally planar top member having a longitudinal centerline and a longitudinal length; a plane of the associated generally vertically oriented planar member intersecting the longitudinal centerline of the generally planar top member, but not bisecting the longitudinal centerline of the generally planar top member,
a first longitudinal support member adjacent the first supporting member and the generally planar top member;
a second longitudinal support member adjacent the second supporting member and the generally planar top member;
wherein the first longitudinal support member is separate from the first supporting member;
wherein the longitudinal length of the generally planar top member defines a longitudinal axis;
wherein the second longitudinal support member is longer than the first longitudinal support member along the longitudinal axis;
wherein a second end of the generally planar top member is cantilevered into a desired space;
an opportunity location, the opportunity location at the second end of the generally planar top member;
a hook or eyelet, the hook or eyelet being mounted to an underside of the second end of the generally planar top member; and
wherein the first longitudinal member is shaped differently than the second longitudinal support member.

10. The article of claim 9, wherein the first interior surface and the second interior surface are separated along the longitudinal length by a fixed width.

11. The article of claim 9, wherein the second longitudinal support member is separate from the second supporting member.

* * * * *